Figure 1:
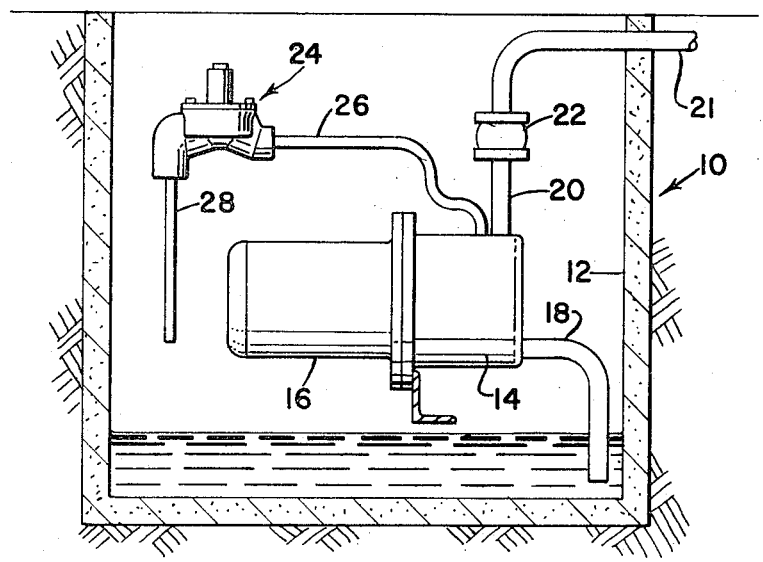

United States Patent
Conery et al.

[11] 3,732,889
[45] May 15, 1973

[54] AIR RELIEF VALVE ASSEMBLY

[75] Inventors: William J. Conery; Donald A. Kaessen, both of Ashland, Ohio

[73] Assignee: Hydr-O-Matic Pump Company, Hayesville, Ohio

[22] Filed: Apr. 8, 1971

[21] Appl. No.: 132,423

[52] U.S. Cl. ............... 137/498, 137/505.13, 251/45, 251/54
[51] Int. Cl. ............................................. F16k 31/12
[58] Field of Search ..................... 137/498, 502, 500, 137/484.4, 484.6, 484.8, 505.32, 484.2, 505.13, 460, 495, 494, 497; 251/45, 36, 54, 24, 48, 61, 61.1, 61.5

[56] References Cited

UNITED STATES PATENTS

| | | | |
|---|---|---|---|
| 1,621,910 | 3/1927 | Thomson et al. | 251/45 X |
| 984,874 | 2/1911 | Winton | 251/54 X |
| 1,501,331 | 7/1924 | Gulick | 251/36 X |
| 2,219,408 | 10/1940 | Benz et al. | 137/505.13 X |
| 2,623,331 | 12/1952 | Greening | 137/498 X |

FOREIGN PATENTS OR APPLICATIONS

| | | | |
|---|---|---|---|
| 106,850 | 9/1924 | Switzerland | 251/45 |
| 624,218 | 2/1936 | Germany | 251/45 |

*Primary Examiner*—Henry T. Klinksiek
*Assistant Examiner*—Robert J. Miller
*Attorney*—Oldham & Oldham

[57] ABSTRACT

A valve for venting air from the pumping chamber of a liquid pumping system. A valve plate is normally held in open position remote from the valve seat by a spring. A flexible diaphragm is attached to the valve plate and divides the valve housing into a through passage and a chamber which communicates with the inlet port of the valve. The valve seat-valve plate arrangement defines a venturi region in the through passage of the valve. Under low pressure, low volume flow conditions, the valve remains in open position. As the flow rate increases, the decrease in pressure across the venturi together with the increased pressure in the chamber behind the diaphragm overcomes the spring pressure to close the valve.

8 Claims, 2 Drawing Figures

PATENTED MAY 15 1973

3,732,889

INVENTORS
WILLIAM J. CONERY
BY DONALD A. KAESSEN

OLDHAM & OLDHAM
ATTORNEYS

AIR RELIEF VALVE ASSEMBLY

In impeller type pumps, the presence of air in the pumping chamber can prevent priming of the pump. This is especially true when the pump must operate against a substantial back pressure. In such situations, some means must be provided to vent the air from the pump chamber. Such means may include manually controlled valves or other externally controlled automatic valves. Such arrangements are inefficient as they require either the presence of an operator or control systems.

It is the primary object of the present invention to provide an air relief valve for a pump which is automatic in its operation and which is self contained, requiring no external control.

It is also an object of the invention to provide an air relief valve which provides reliable operation.

Another object of the invention is the provision of an air relief valve for a pump which is of simple and trouble free design.

The above and other objects of the invention which will become apparent in the following detailed description are achieved by providing an air relief valve assembly which consists essentially of a valve housing having inlet and outlet ports and a valve seat, a valve plate adapted to mate with the valve seat to close the valve, a stem connected to the valve plate and extending away from the valve seat, spring means for normally urging the valve stem and valve plate into an open position remote from the valve seat, and a flexible diaphragm connected to the valve casing and to the valve plate to divide the interior of the valve casing into a through chamber across the valve seat and a blind chamber communicating only with the inlet port of the valve.

For a more complete understanding of the invention and the objects and advantages thereof, reference should be had to the following detailed description and the accompanying drawing wherein there is shown a preferred embodiment of the invention.

Figure 2:
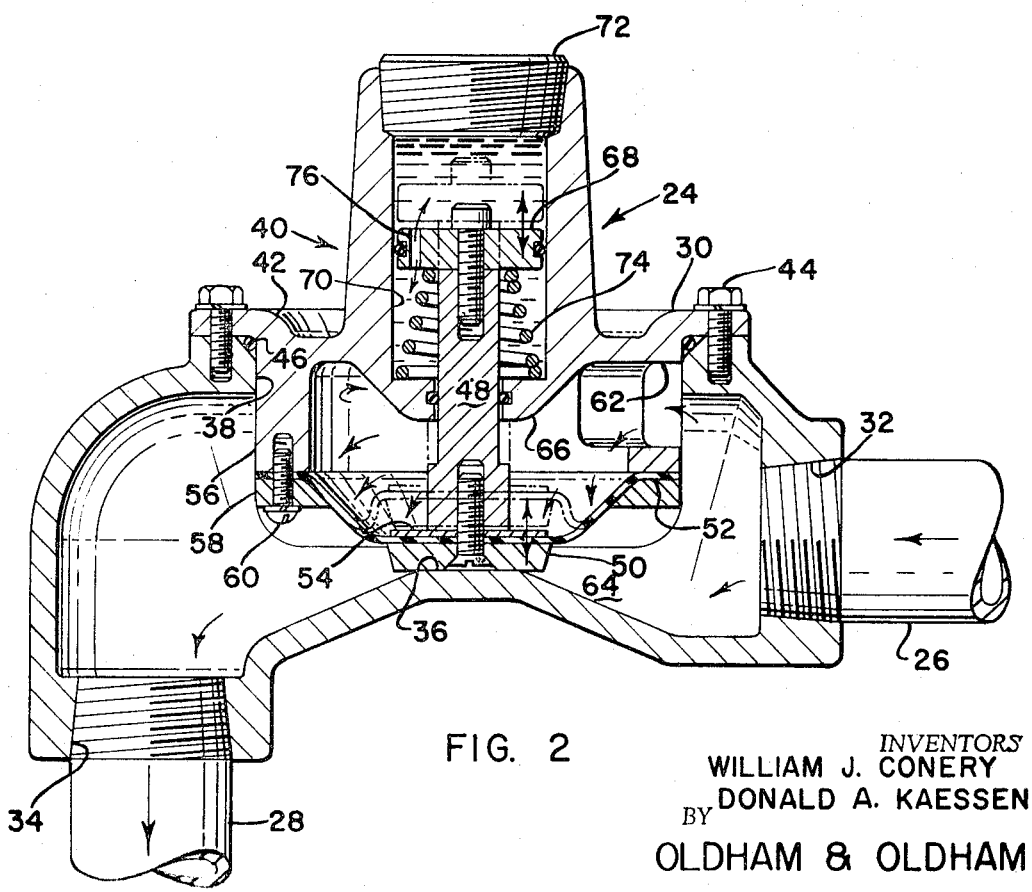

In the drawing:

FIG. 1 is a schematic side elevational view of a sump pump arrangement employing the air relief valve of the present invention; and FIG. 2 is a sectional view of the air relief valve of the present invention, showing the valve in its closed position.

One use of the air relief valve of the present invention is in conjunction with a sump pumping arrangement of a sewage system. Such an arrangement is designated generally by the reference numeral 10 in FIG. 1 and includes a sump 12 which serves to collect sewage or other liquid. An impeller type pump 14 driven by a motor 16 has an inlet means 18 for drawing liquid from the sump 12 and discharging the same through a discharge pipe 20 which may, for example, be connected to a discharge main 21 of a sewage system. The motor 16 and pump 14 can be supported or positioned in the sump in any known manner. The system includes a check valve 22 to prevent the reverse flow of sewage or other liquid from the main 21 into the sump 12. The motor 16 is operated by suitable controls, not shown, which may consist of a level actuated switch which starts the motor 16 whenever the liquid level in the sump 12 rises beyond a predetermined upper level and stops the motor 16 whenever the liquid level drops below a predetermined lower level. In the event the pumping chamber of the pump 14 becomes fully or partially filled with air when the pump is not operating, the pump 14 would not be self priming when it is next started up. The combination of the check valve 22 and the back pressure in the main 21 produce substantial back pressure on the discharge line 20 of the pump 14 to prevent the expulsion of the air entrapped in the pumping chamber. In order to overcome this difficulty, the present invention provides an air relief valve 24 which is connected by a suitable conduit 26 to the discharge port of the pump 14 as is the pipe 20. The valve 24 may be provided with a discharge pipe 28 for returning any fluid passing through the valve 24 to the sump 12. As will be explained in more detail below, the valve 24 is held in an open position until sufficient pressure is built up by the discharge of the pump 14 to close the valve. Thus, the valve 24 permits the complete venting of any air from the pumping chamber of the pump 14 but then automatically closes and remains closed while the pump is operating.

Referring now to FIG. 2, the structure and operation of the air relief valve of the present invention will be described. A valve casing 34 has an inlet port 32 for connection to the conduit 26 and an outlet port 34 for connection to the discharge pipe 28. Intermediate the inlet and outlet ports 32 and 34, respectively, the valve casing 30 is formed to define a valve seat 36. The wall of the valve casing opposite the valve seat 36 is provided with an opening 38 in which is mounted a valve head assembly designated generally by the reference numeral 40. The valve head assembly 40 includes a housing 42 which is secured to the valve casing 30 by cap screws or bolts 44. A sealing ring 46 is provided to assure a fluid tight seal between the valve casing 30 and the valve head assembly housing 42. Slidably received within the housing is a stem 48 which carries a valve head 50 at its inner end. The valve head 50 is of complementary configuration to the valve seat 36. Also secured to the inner end of the stem or rod 48 is a flexible diaphragm 52 which is retained between the valve head 50 and a backing plate 54 at the inner end of the stem 48. The outer edge of the flexible diaphragm 52 is secured to an annular wall 56 which projects into the cavity of the valve casing 30 from the housing 42. A retaining ring 58 and screws 60 secure the outer end of the diaphragm to the end of the annular wall 56. The annular wall 56 is provided with an opening 62 which communicates with the inlet port 32 of the valve casing 30. The diaphragm 52 and annular wall 56 thus divide the interior of the valve casing into a through chamber 64 extending from the inlet port 32 across the valve seat 36 to the outlet port 34 and a blind chamber 66 which communicates only with the inlet port 32 through the opening 62 in the annular wall 56. The upper end of the stem 48 carries a piston 68 which is received in a bore 70 of the housing 42. The outer end of the bore 70 is closed by an end cap or plug 72. A coil spring 74 is positioned between the piston 68 and the inner end of the bore 70 to normally force the stem 48 and the valve head 50 away from the valve seat 36. The bore 70 is substantially filled with oil and the piston 68 is provided with a small diameter through bore 76. Thus, the piston 68 and the bore 70 form a dash pot to dampen or slow the movement of the stem 48 and of the valve head 50 toward or away from the valve seat 36.

When the pump 14 is not operating, there is no pressure in the line 26 or in the inlet 32 of the air relief valve 24. Under these conditions, the spring 74 forces the valve head 50 to its open position. When the pump 14 is started, air and liquid will first be forced through the conduit 26 to the valve 24 since there is less resistance in this path than is encountered through the main discharge pipe 20, the check valve 22, and the main 21. Since the valve 24 is open, the initial flow from the pump 14 will be through the valve 24 to the discharge pipe 28 and returning to the sump 12. As was pointed out above, the valve seat 36 and valve head 50 define a venturi in the flow path from the valve inlet 32 to the valve outlet 34. Thus, as liquid flow through the valve increases a pressure reduction across the valve head 50 occurs. At the same time, fluid is entering the blind chamber 60 behind the flexible diaphragm 52. As a result, there is increased pressure on the back side of the flexible diaphragm 52. The combination of these two pressures or differentials eventually becomes sufficient to overcome the biasing force of the spring 74 and the valve head 50 is thus moved toward the valve seat 36. The movement of the piston 68 is restrained, however, by the flow of oil through the small passage 76 so that the closing of the valve is gradual, allowing sufficient time for complete venting of air from the chamber of the pump 14. Once the valve 24 is closed and as long as the pump continues to operate the valve remains in its closed position since liquid under pressure from the pump is supplied to the blind chamber 66 and hence to the entire rear side of the flexible diaphragm 52 while that portion of the front side of the diaphragm 52 and the discharge side of the through chamber 64 is under no pressure.

The valve 24 is a self contained unit, requiring no external controls. Since the flow stream through the valve is across both the valve seat 36 and the valve head 50, there is no buildup of debris on these components and the valve is self cleaning.

While only the best known embodiments of the invention have been illustrated and described in detail, the invention is not so limited. Reference should therefore be had to the appended claims in determining the true scope of the invention.

What is claimed is:

1. An air relief valve for use with a pumping system to vent air from the pumping chamber, comprising:
   a casing having inlet and outlet ports, a chamber connecting the ports, and a valve seat intermediate the inlet and outlet ports and extending transversely of the fluid flow path between the ports;
   a valve head adapted to be brought into engagement with the valve seat to block fluid flow between the inlet and outlet ports;
   a rod connected at one end to the valve head and slidably received in the casing for movement toward and away from the valve seat;
   a flexible diaphragm connected at its periphery to the casing and at its center to the valve head, the diaphragm dividing the chamber into a first chamber communicating with the inlet and outlet ports and extending across the valve seat and a second chamber communicating only with the inlet port; and
   the casing being contoured in the area of the valve seat so as to form, in conjunction with the valve head and the flexible diaphragm, a venturi region across the valve seat.

2. A valve comprising:
   a valve casing having inlet and outlet ports and a chamber connecting the ports;
   a valve seat formed on a wall of the chamber, intermediate the inlet and outlet ports, and extending transversely to the path of fluid flow between the ports;
   a valve head assembly adapted to engage the valve seat and movable toward and away from the seat along a line generally perpendicular to the fluid flow path;
   a flexible diaphragm connected to the valve head assembly and to the valve casing, the diaphragm dividing the chamber into a through chamber communicating with the inlet and outlet ports when the valve head member is out of engagement with the valve seat and into a second chamber communicating with the inlet port only and on the opposite side of the diaphragm from the valve seat; and
   the casing being of such configuration in the region of the valve seat as to form in conjunction with the valve head assembly a venturi region in the fluid flow path across the valve seat.

3. A valve comprising:
   a valve casing having inlet and outlet ports and a chamber connecting the ports;
   a valve seat formed on a wall of the chamber, intermediate the inlet and outlet ports, and extending transversely to the path of fluid flow between the ports;
   a valve head assembly adapted to engage the valve seat and movable toward and away from the seat along a line generally perpendicular to the fluid flow path;
   a flexible diaphragm connected to the valve head assembly and to the valve casing, the diaphragm dividing the chamber into a through chamber communicating with the inlet and outlet ports when the valve head member is out of engagement with the valve seat and into a second chamber communicating with the inlet port only and on the opposite side of the diaphragm from the valve seat;
   biasing means connected to the valve head assembly biasing the assembly away from the valve seat and including dampening means to control the rate of movement of the valve head assembly; and
   the valve head assembly comprises a valve head and a rod secured to the valve head and extending therefrom in a direction generally perpendicular to the fluid flow path, the diaphragm being connected to the valve head assembly between the valve head and the rod, the rod being slidably received in the casing, and the biasing means including spring means engaging the casing and the rod.

4. The valve according to claim 3 wherein the end of the rod remote from the valve head is received in a bore in the casing and wherein the dampening means comprises a piston connected to the remote end of the rod, having sliding fluid-tight engagement with the rod, and having a small orifice extending through the piston, the bore being substantially filled with a liquid.

5. The air relief valve according to claim 1 further including biasing means for normally holding the valve head away from the valve seat.

6. The air relief valve according to claim 5 further including dampening means to regulate the rate of movement of the valve head toward the valve seat.

7. The air relief valve according to claim 1 wherein the other end of the rod extends into a closed bore within the casing, a piston having sliding, fluid-tight engagement with the bore walls secured to said other end of the rod, the piston having a small diameter orifice, the bore being substantially filled with a liquid, and including spring means for biasing the piston, rod and valve head away from the valve seat.

8. The air relief valve according to claim 7 wherein the casing is comprised of a first casing section having the inlet and outlet ports and the valve seat and a second casing section having the bore and receiving the valve head, rod, piston, spring means, and flexible diaphragm, the first and second casing sections being removably secured together.

* * * * *